United States Patent
Rajendran et al.

(10) Patent No.: US 11,162,717 B2
(45) Date of Patent: Nov. 2, 2021

(54) SUPPLEMENTAL COOLING FOR AN HVAC SYSTEM

(71) Applicant: Johnson Controls Technology Company, Auburn Hills, MI (US)

(72) Inventors: Vinoraj Rajendran, Cuddalore (IN); Anil V. Bhosale, District Satara (IN); Arun K. Tiwari, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 61 days.

(21) Appl. No.: 16/234,326

(22) Filed: Dec. 27, 2018

(65) Prior Publication Data

US 2020/0200445 A1 Jun. 25, 2020

Related U.S. Application Data

(60) Provisional application No. 62/782,665, filed on Dec. 20, 2018.

(51) Int. Cl.
*F25B 25/00* (2006.01)
*F25B 49/02* (2006.01)
*F24F 5/00* (2006.01)

(52) U.S. Cl.
CPC .......... *F25B 25/005* (2013.01); *F24F 5/0017* (2013.01); *F25B 49/022* (2013.01)

(58) Field of Classification Search
CPC ...... F25B 49/022; F25B 25/005; F24F 5/0017
See application file for complete search history.

(56) References Cited

U.S. PATENT DOCUMENTS

| 4,406,138 A * | 9/1983 | Nelson .................... F25D 17/02 62/305 |
| 5,090,207 A | 2/1992 | Gilbertson et al. |
| 5,265,442 A * | 11/1993 | Lamie .................. F24F 5/0096 62/118 |
| 5,598,716 A | 2/1997 | Tanaka et al. |
| 5,724,827 A | 3/1998 | Yamaguchi et al. |
| 6,158,499 A | 12/2000 | Rhodes et al. |
| 2001/0013230 A1* | 8/2001 | Agekura ............... F24F 5/0017 62/436 |
| 2005/0262870 A1 | 12/2005 | Narayanamurthy et al. |
| 2008/0307803 A1* | 12/2008 | Herzon .................. F24F 3/147 62/93 |

(Continued)

*Primary Examiner* — Elizabeth J Martin
*Assistant Examiner* — Nael N Babaa
(74) *Attorney, Agent, or Firm* — Fletcher Yoder, P.C.

(57) ABSTRACT

The present disclosure relates to a heating, ventilation, and/or air conditioning (HVAC) system. The HVAC system includes an air handling unit configured to transfer heat between a refrigerant and an airflow, a first heat exchanger configured to receive the refrigerant from the air handling unit and transfer heat between the refrigerant and a first working fluid, a cooling bank including a vessel and a coil disposed in the vessel, wherein the coil is configured receive the first working fluid from the first heat exchanger and configured to transfer heat between the working fluid and a second working fluid within the vessel, and a second heat exchanger configured to receive the second working fluid and to transfer heat between the second working fluid and the airflow, wherein the second heat exchanger is disposed upstream of the air handling unit with respect to a flow path of the airflow.

8 Claims, 9 Drawing Sheets

(56) References Cited

U.S. PATENT DOCUMENTS

| | | | |
|---|---|---|---|
| 2015/0114019 A1* | 4/2015 | Van Gysel | F24D 17/001 62/238.7 |
| 2016/0186427 A1* | 6/2016 | Castelle | B32B 15/06 52/309.3 |
| 2016/0363351 A1* | 12/2016 | Kawano | F25B 1/08 |
| 2017/0138023 A1* | 5/2017 | Dooley | F25B 41/00 |

* cited by examiner

SUPPLEMENTAL COOLING FOR AN HVAC SYSTEM

CROSS REFERENCE TO RELATED APPLICATIONS

This application claims priority from and the benefit of U.S. Provisional Application Ser. No. 62/782,665, entitled "SUPPLEMENTAL COOLING FOR AN HVAC SYSTEM," filed Dec. 20, 2018, which is herein incorporated by reference in its entirety for all purposes.

BACKGROUND

The present disclosure relates generally to heating, ventilation, and/or air conditioning (HVAC) systems and, more particularly, to a cooling or ice bank for an HVAC system.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A wide range of applications exist for HVAC systems. For example, residential, light commercial, commercial, and industrial HVAC systems are used to control temperatures and air quality in residences and other buildings. Certain HVAC units can be dedicated to either heating or cooling, although many HVAC units are capable of performing both functions. HVAC units may also provide ventilation to a conditioned interior space. In general, HVAC systems operate by implementing a thermodynamic cycle in which a refrigerant undergoes alternating phase changes to remove heat from or deliver heat to a conditioned interior space of a building. Heating may also be provided by heat pumps, gas furnace heat exchangers, electric resistance heat, and/or steam or hot water coils. Certain HVAC systems may heat or cool environmental air and/or return air to condition an interior space. The return air and/or the environmental air may be placed in thermal communication with a refrigerant by passing the return air and/or the environmental air across a heat exchanger of the HVAC system. Unfortunately, during periods of high load demand, the HVAC system may utilize relatively large amounts of power to condition the return air and/or the environmental air to a target temperature in order to effectively condition the interior space.

SUMMARY

The present disclosure relates to a heating, ventilation, and/or air conditioning (HVAC) system. The HVAC system includes an air handling unit configured to transfer heat between a refrigerant and an airflow, a first heat exchanger configured to receive the refrigerant from the air handling unit and transfer heat between the refrigerant and a first working fluid, a cooling bank including a vessel and a coil disposed in the vessel, wherein the coil is configured receive the first working fluid from the first heat exchanger and configured to transfer heat between the working fluid and a second working fluid within the vessel, and a second heat exchanger configured to receive the second working fluid and to transfer heat between the second working fluid and the airflow, wherein the second heat exchanger is disposed upstream of the air handling unit with respect to a flow path of the airflow.

The present disclosure also relates to a heating, ventilation, and/or air conditioning (HVAC) system having a vapor compression circuit configured to circulate a refrigerant through a first heat exchanger, wherein the first heat exchanger is configured to transfer heat between the refrigerant and an airflow, an auxiliary refrigerant circuit including a second heat exchanger, wherein the auxiliary refrigerant circuit is fluidly coupled to the vapor compression circuit, a first working fluid circuit configured to circulate a first working fluid between the second heat exchanger and a cooling bank, wherein the second heat exchanger is configured to transfer heat between the refrigerant and the first working fluid, and a second working fluid circuit configured to circulate a second working fluid between the cooling bank and a third heat exchanger, wherein the cooling bank is configured to transfer heat between the first working fluid and the second working fluid, the third heat exchanger is configured to transfer heat between the second working fluid and the airflow, and the third heat exchanger is disposed upstream of the first heat exchanger with respect to the airflow.

The present disclosure further relates to a heating, ventilation, and/or air conditioning (HVAC) system having an air handling unit configured to transfer heat between a refrigerant and an airflow, a supplemental cooling system including a cooling bank, a heat exchanger, and a pump, wherein the cooling bank is in indirect thermal communication with the refrigerant, wherein the pump is configured to circulate a working fluid between the cooling bank and the heat exchanger, and wherein the heat exchanger is positioned upstream of the air handling unit with respect to the airflow, and a controller configured to receive feedback indicative of an operating parameter of the HVAC system, compare the feedback to a threshold value, and actuate the pump to adjust a flow of the working fluid from the cooling bank to the heat exchanger in response to a determination that the feedback is above the threshold value.

Other features and advantages of the present application will be apparent from the following, more detailed description of the embodiments, taken in conjunction with the accompanying drawings, which illustrate, by way of example, the principles of the application.

DRAWINGS

Various aspects of this disclosure may be better understood upon reading the following detailed description and upon reference to the drawings in which.

DETAILED DESCRIPTION

Figure 1:
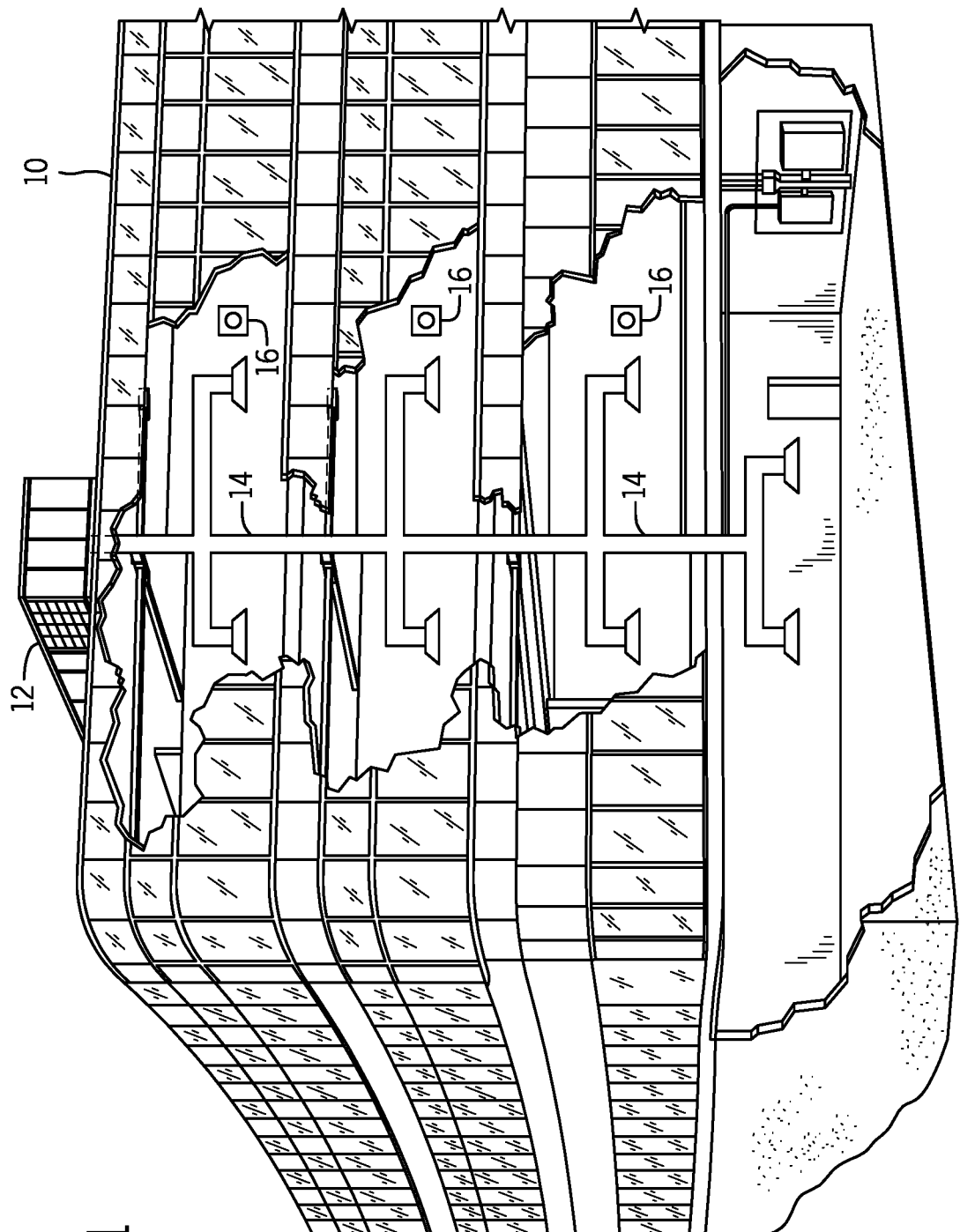
FIG. 1 is a schematic of an embodiment of an environmental control system for building environmental management that may employ one or more HVAC units, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

HVAC systems may operate at varying capacities throughout a duration of a given time period, such as a day, due to temperature fluctuations of environments surrounding the HVAC systems. For example, when in a cooling mode, an HVAC system may operate at a relatively high capacity during daytime hours as compared to nighttime hours because higher environmental temperatures and greater sun exposure generally occur during the daytime. As such, the HVAC system may run at a greater capacity in order to enable the HVAC system to provide an airflow to an interior space at a relatively low target temperature. During the nighttime hours, the HVAC system may run at a relatively low capacity and still provide the airflow to the interior space at the relatively low target temperature. Therefore, the HVAC system may conserve power during the nighttime hours. However, in some cases, the HVAC system may utilize large amounts of power during the daytime when operating at the relatively high capacity. It is now recognized that increasing a capacity of the HVAC system during periods of low demand, such as at night, to enable supplemental thermal energy transfer during periods of high demand may increase an overall efficiency of the HVAC system.

For example, embodiments of the present disclosure relate to an HVAC system that may include an air handling unit, a first heat exchanger, a cooling bank or ice bank, and a second heat exchanger. In general, the air handling unit may indirectly cool and/or freeze at least a portion of a fluid stored in the cooling bank during periods of low operating capacity of the HVAC system. The cooling bank may be a heat exchanger that is configured to transfer thermal energy from the fluid to an additional fluid, such as a brine. Additionally, the cooling bank may store the cooled and/or partially frozen fluid for later use, such as for providing supplemental cooling of an airflow received by the air handling unit during periods of high operating capacity. For instance, the cooling bank may include an insulated vessel that stores and/or receives the fluid, as well as a coil that places the fluid in thermal communication with an additional fluid. In some embodiments, the cooling bank may store the cooled and/or partially frozen fluid for hours, days, or weeks until the operating capacity of the HVAC is above a threshold level indicative of a high operating capacity.

More specifically, the air handling unit may divert at least a portion of refrigerant flow to a first heat exchanger, such as through an auxiliary refrigerant circuit. The first heat exchanger may transfer heat between the portion of refrigerant from the auxiliary refrigerant circuit and a first working fluid. Further, the cooling bank may transfer heat between the first working fluid and a second working fluid that is ultimately directed to the second heat exchanger. As such, the second working fluid within the cooling bank is cooled or at least a portion of the second working fluid is frozen and stored in the cooling bank for later use by the second heat exchanger to provide supplemental cooling to the airflow received by the air handling unit, such as during the day or other periods of high load demand. At such times, the fluid may be directed to the second heat exchanger to pre-condition the airflow upstream of the third heat exchanger of the air handling unit with respect to a direction of the airflow. As such, the airflow be further conditioned by the third heat exchanger of the air handling unit before being directed into an interior space to be conditioned by the HVAC system. The supplemental cooling provided by the second heat exchanger may increase an efficiency and reduce operating costs of the HVAC system during periods of high load demand, such as during the daytime.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
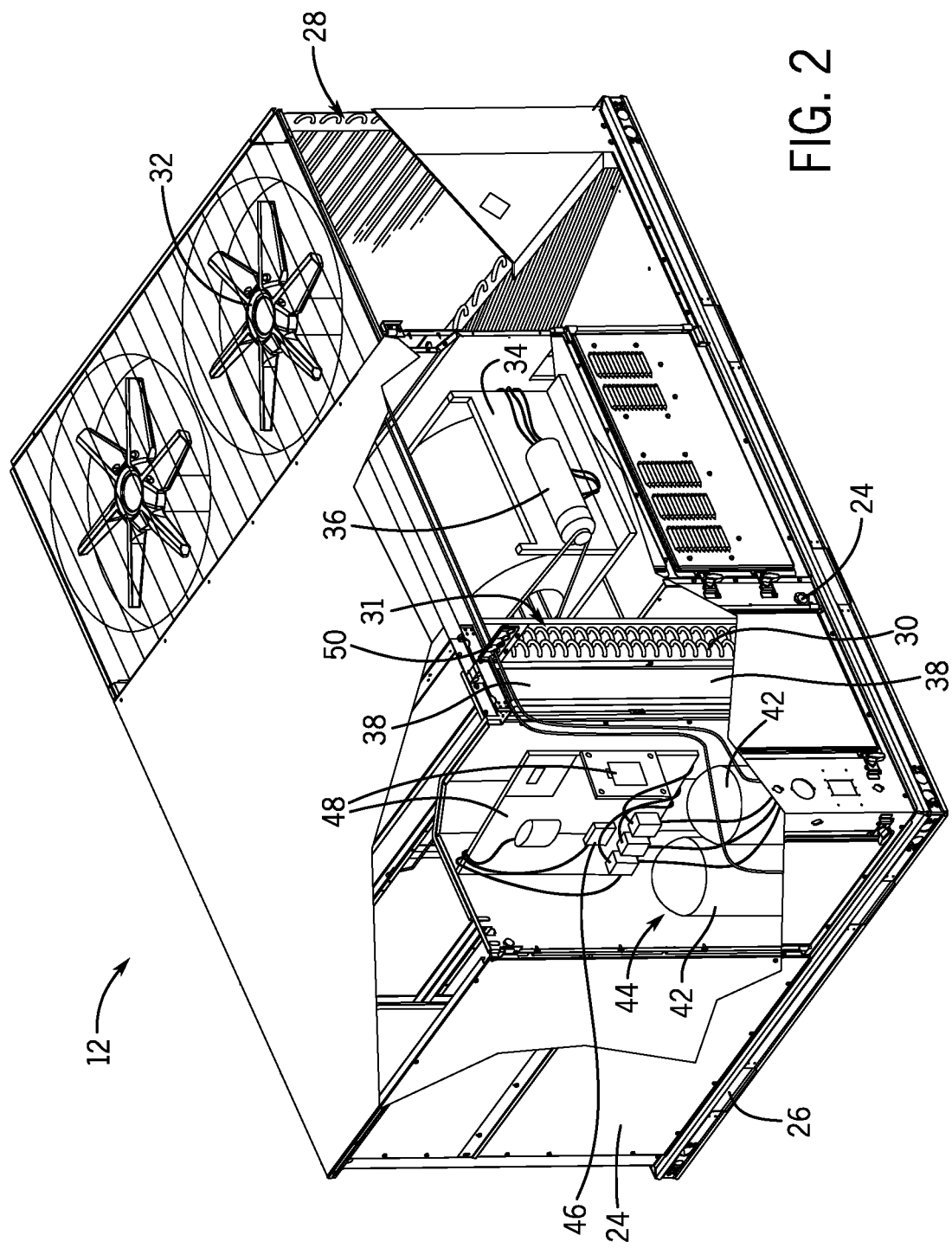
FIG. 2 is a perspective view of an embodiment of a packaged HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
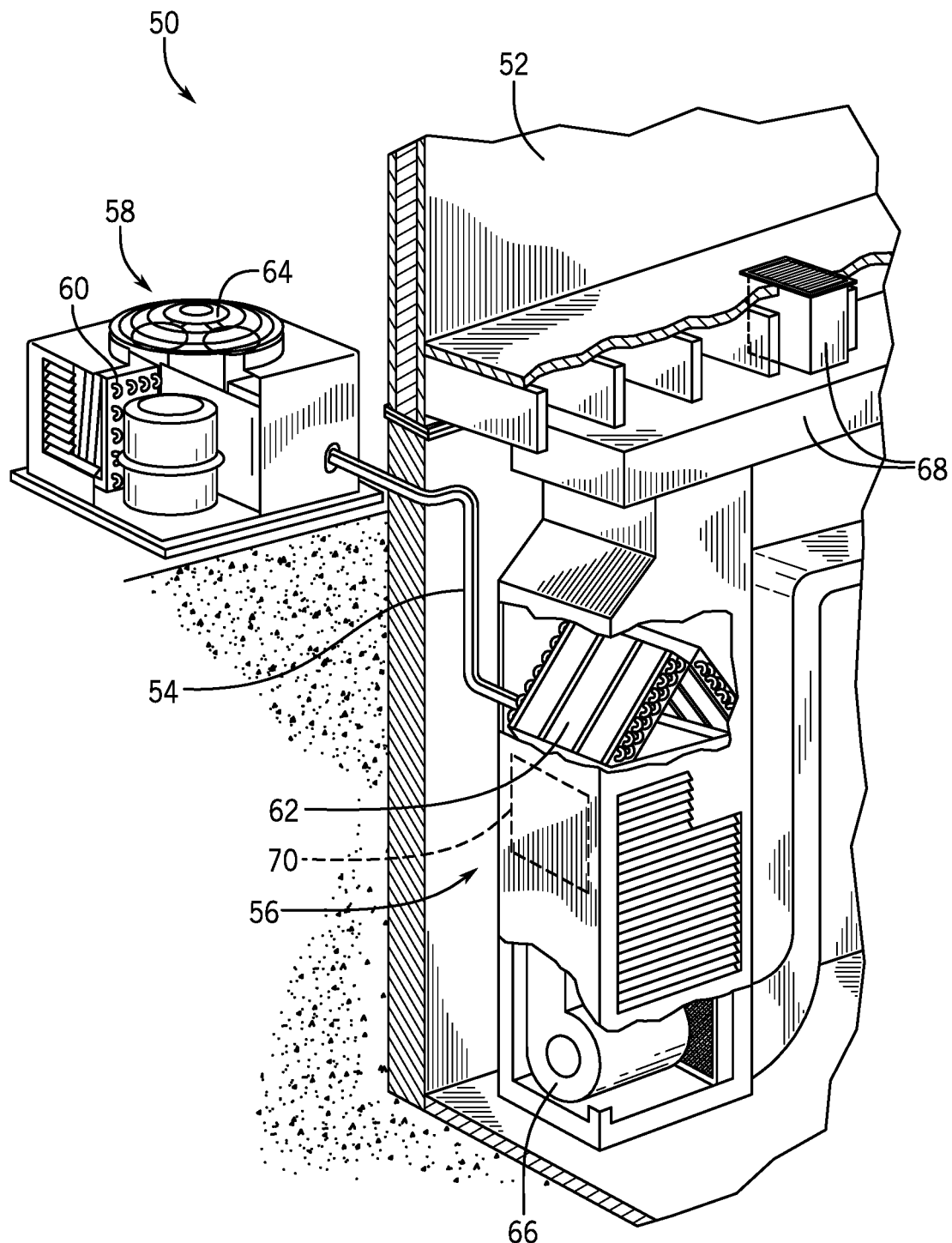
FIG. 3 is a schematic of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
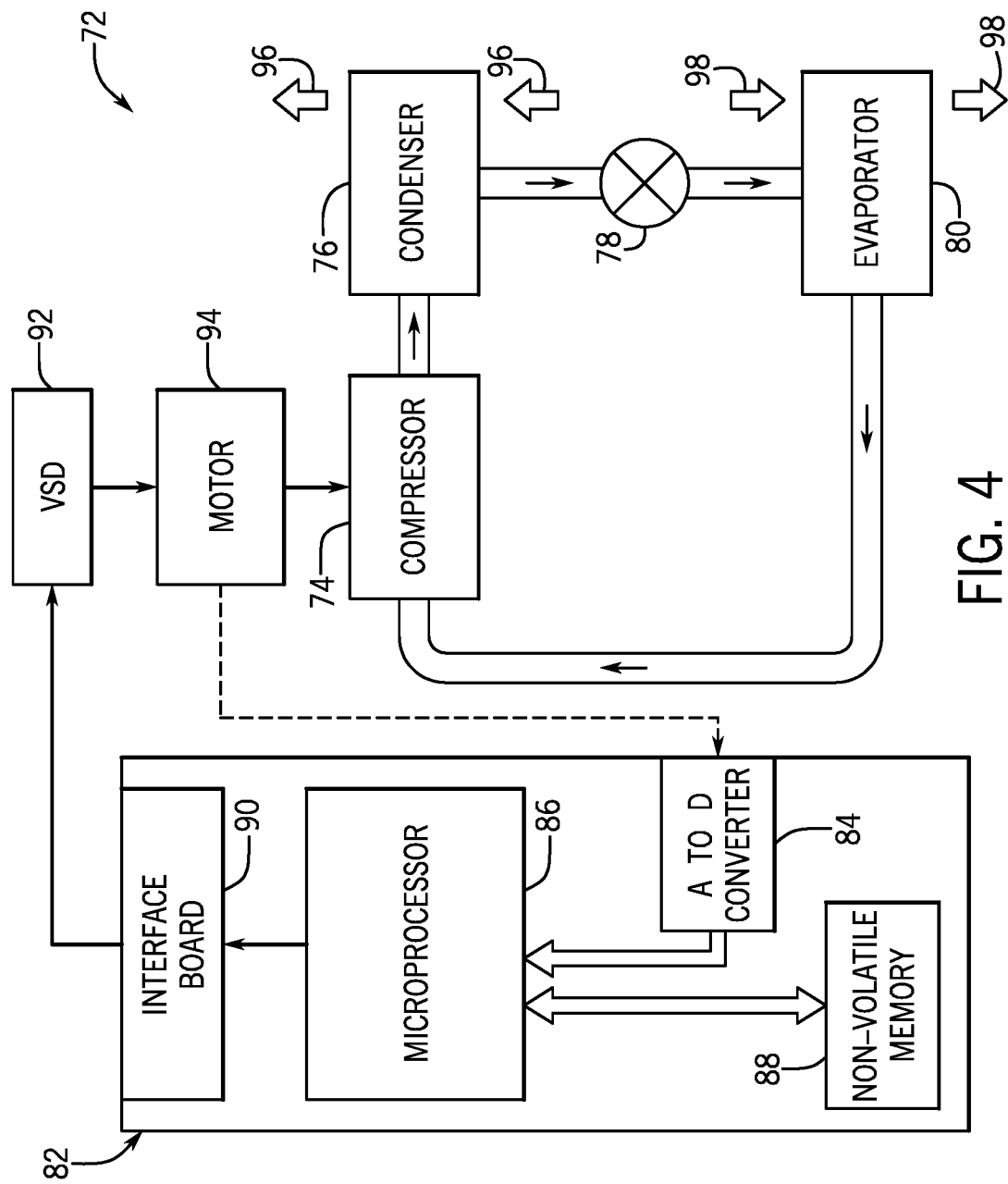
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, it may be advantageous to include a cooling or ice bank within an HVAC system, such as the HVAC unit 12 and/or the residential heating and cooling system 50, to improve the efficiency of the HVAC system. As discussed above, the HVAC system may include a first heat exchanger, such as a shell and tube heat exchanger, which transfers heat between a portion of refrigerant diverted from a refrigeration circuit of the HVAC system and a first working fluid. The first working fluid may also exchange heat with a second working fluid in the cooling bank, where the second working fluid may be stored for later use and/or provided to a second heat exchanger to pre-condition, or pre-cool, an airflow directed through an air handling unit having the second heat exchanger. In general, the first working fluid is a fluid having a lower freezing point than the second working fluid. For example, the first working fluid may be a mixture of water and salt, such as a brine, water, glycol, a mixture of water and glycol, or another suitable fluid, and the second working fluid may be water or another suitable fluid or fluid mixture. As such, the first working fluid may cool or freeze at least a portion of the second working fluid via heat transfer within the cooling bank. While the discussion below describes present embodiments of the cooling bank as an ice bank, it should be appreciated that the second working fluid circulated and stored within cooling or ice bank may be or may include a fluid other than water.

Further, the first working fluid may continue to circulate through the first heat exchanger, where it is cooled by the refrigerant so that the first working fluid may subsequently cool the second working fluid with the cooling bank. As discussed herein, the HVAC system may operate to cool the second working fluid during periods of low load demand on the HVAC system, such as during the night. During periods of high load demand, the cooled second working fluid may be provided to the second heat exchanger, which may be disposed in the air handling unit, to transfer heat between the airflow and the second working fluid.

Figure 5:
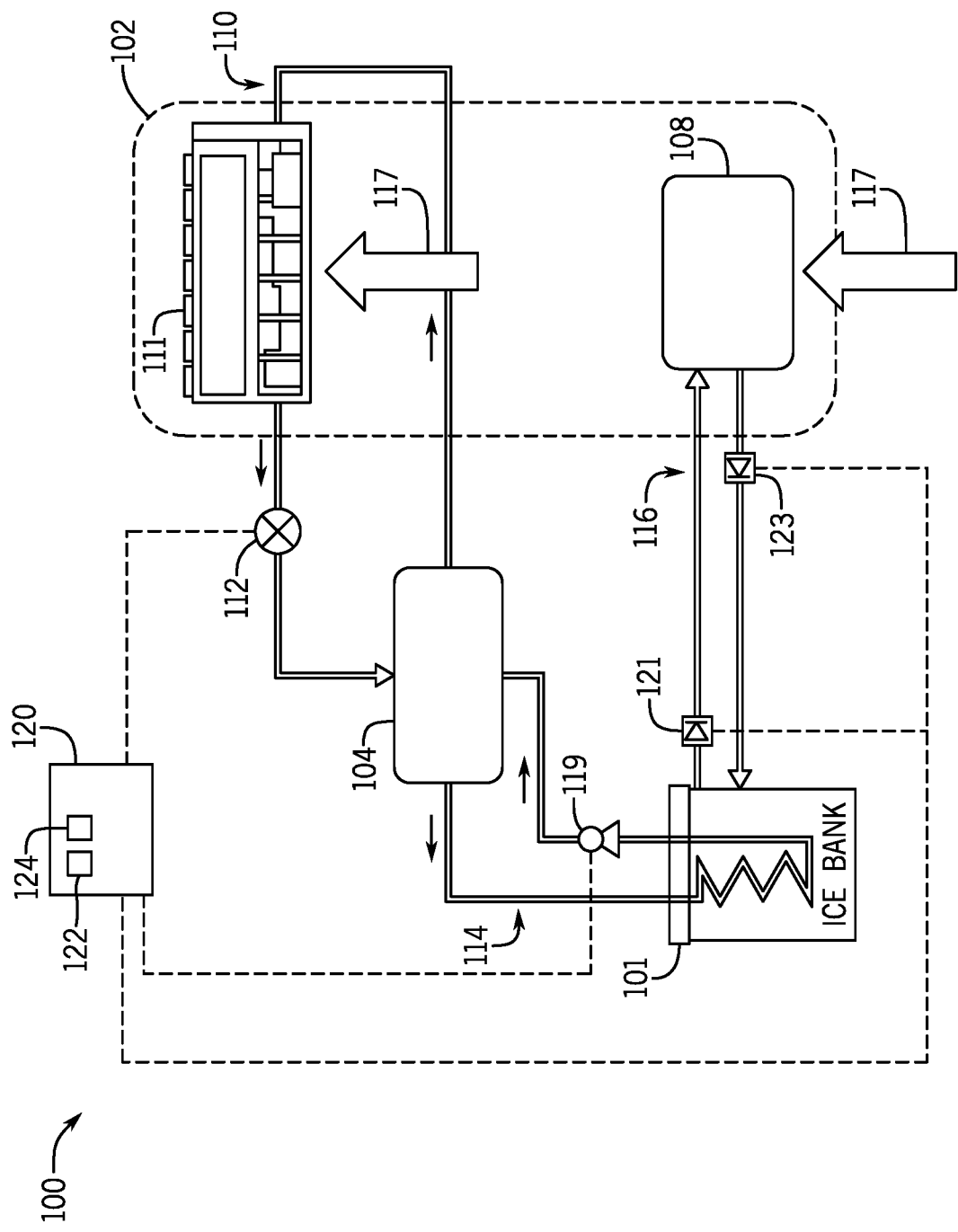
FIG. 5 is a schematic diagram of an embodiment of an HVAC system, in accordance with an aspect of the present disclosure.

For instance, FIG. 5 is a schematic diagram illustrating an embodiment of an HVAC system 100 that may include a cooling bank or ice bank 101 to improve an efficiency of the HVAC system 100, in accordance with an aspect of the present disclosure. In certain embodiments, the HVAC system 100 may include the HVAC unit 12 and/or the residential heating and cooling system 50. As shown in the illustrated embodiment of FIG. 5, the HVAC system 100 includes an air handling unit 102, a first heat exchanger 104, the ice bank 101, and a second heat exchanger 108. The first heat exchanger 104 is selectively fluidly coupled to an auxiliary refrigerant circuit 110 of the HVAC system 100. In some embodiments, the auxiliary refrigerant circuit 110 includes refrigerant that is utilized within an HVAC unit 111, such as a rooftop unit having the vapor compression system 72. The HVAC unit 111 may include and/or be at least partially disposed within the air handling unit 102. Refrigerant flowing within the HVAC unit 111 may be selectively directed to the auxiliary refrigerant circuit 110, and thus the first heat exchanger 104, via a valve 112. For example, the valve 112 may transition between an open position and a closed position based on a load demand on the HVAC unit 111 and/or the HVAC system 100.

A first working fluid is configured to be circulated within a first working fluid circuit 114, or a first working fluid circuit, between the ice bank 101 and the first heat exchanger 104. Accordingly, the first heat exchanger 104 places the refrigerant and the first working fluid in thermal communication with one another. For example, in some embodiments, the first working fluid may transfer thermal energy to the refrigerant within the first heat exchanger 104, thereby reducing a temperature of the first working fluid. Further, a second working fluid may be circulated through a second working fluid circuit 116, or a second working fluid circuit, that includes the ice bank 101 and the second heat exchanger 108. Accordingly, the ice bank 101 places the first working fluid in thermal communication with the second working fluid. For example, in some embodiments, the second working fluid may transfer thermal energy to the first working fluid within the ice bank 101, thereby reducing a temperature of the second working fluid. The second working fluid may be stored in the ice bank 101 to provide supplemental cooling to an airflow 117 during periods of high load demand.

For example, during periods of high load demand, the second heat exchanger 108 may place the second working fluid in thermal communication with the airflow 117, such as an environmental air flow or return air, flowing through the air handling unit 102. The airflow 117 may pass over tubes of the second heat exchanger 108 and transfer thermal energy to the second working fluid flowing through the second heat exchanger 108. Further, as shown in the illustrated embodiment of FIG. 5, the airflow 117 may flow from the second heat exchanger 108 toward the HVAC unit 111, where the airflow 117 may transfer additional thermal energy to the refrigerant flowing through a third heat exchanger, such as the evaporator 80, of the HVAC unit 111. For instance, the HVAC unit 111 may include features similar to the vapor compression system 72 and, in operation, cool the airflow 117 via heat exchange between the refrigerant and the airflow 117 in the evaporator 80. While the illustrated embodiment of FIG. 5 includes the first heat exchanger 104 for transferring thermal energy between the refrigerant and the first working fluid, in other embodiments, the ice bank 101 may be in direct thermal communication with the auxiliary refrigerant circuit 110, thereby eliminating the first heat exchanger 104 and the first working fluid circuit 114 circulating the first working fluid.

As shown in the illustrated embodiment of FIG. 5, the first working fluid circuit 114 and/or the second working fluid circuit 116 include pumps 119, 121, 123, which may each be controlled by a respective motor having a variable speed drive ("VSD"). The pump 119 and the pumps 121, 123 may circulate the first working fluid and the second working fluid through the first working fluid circuit 114 and the second working fluid circuit 116, respectively. The valve 112 and/or the pumps 119, 121, 123 may be communicatively coupled to a controller 120 having a memory 122 and a processor 124, which may be utilized to adjust a position of the valve 112 and/or a speed of the pumps 119, 121, 123. In some embodiments, the controller 120 may be the control panel 82. The memory 122 may be a mass storage device, a flash memory device, removable memory, or any other non-transitory computer-readable medium that includes instructions for the processor 124 to execute. The memory 122 may also include volatile memory such as randomly accessible memory (RAM) and/or non-volatile memory such as hard disc memory, flash memory, and/or other suitable memory formats. The processor 124 may execute the instructions stored in the memory 122, in order to adjust operation of the valve 112 and/or the pumps 119, 121, 123, for example.

During operation, the valve 112 may receive a control signal from the controller 120 that may cause the valve 112 to at least partially open and, thus, enable refrigerant to flow from the HVAC unit 111 and circulate through the auxiliary refrigerant circuit 110. In some embodiments, the valve 112 may be in fluid communication with the vapor compression system 72 of the HVAC unit 111. Accordingly, opening the valve 112 may enable a portion of refrigerant circulating between components of the vapor compression system 72 to flow into and through the auxiliary refrigerant circuit 110. For instance, the refrigerant may be directed from the expansion valve 78 and into the auxiliary refrigerant circuit 110. In other words, the refrigerant within the vapor compression system 72 may bypass the evaporator 80 of the vapor compression system 72 and enter the auxiliary refrigerant circuit 110 to exchange thermal energy with the first working fluid via the first heat exchanger 104. In such cases, the refrigerant may have a reduced temperature and is configured to absorb thermal energy from the first working fluid in order to reduce the temperature of the first working fluid. The refrigerant exiting the first heat exchanger 104 within the auxiliary refrigerant circuit 110 may then re-enter the vapor compression system 72 upstream of the compressor 74, upstream of the condenser 76, or at another suitable location within the vapor compression system 72. In any case, the refrigerant flowing through the auxiliary refrigerant circuit 110 flows through the first heat exchanger 104, where heat is transferred between the refrigerant and the first working fluid of the first working fluid circuit 114, and is directed back to the vapor compression system 72. The first working fluid may be any suitable fluid for exchanging heat with the refrigerant. For example, the first working fluid may be a mixture of water and salt, such as a brine, water, glycol, a mixture of water and glycol, or another suitable fluid. The first heat exchanger 104 may be any suitable type of heat exchanger that facilitates thermal communication between the refrigerant and the first working fluid, such as a shell and tube heat exchanger or a tube in tube heat exchanger.

The first working fluid flows from the first heat exchanger 104 and through the ice bank 101, where heat is transferred between the first working fluid and a second working fluid stored within an interior portion of the ice bank 101. In some embodiments, the pump 119 circulates the first working fluid through the ice bank 101. In other embodiments, the first working fluid may flow between the first heat exchanger 104 and the ice bank 101 via gravity, natural convection, pressure differentials, or any combination thereof. As discussed herein, heat transfer between the first working fluid and the second working fluid may result in a reduction in temperature of the second working fluid. The second working fluid may be stored for later use, such as when an operating parameter indicative of the capacity and/or load demand of the HVAC unit 111 is above a threshold. For instance, the controller 120 may be configured to monitor the operating parameter indicative of the capacity and/or load demand of the HVAC unit 111, such as ambient temperature, a temperature of the interior space to be conditioned, an amount of power input to the HVAC unit 111, an amount of power supplied to the compressor 74, a speed of the compressor 74, a temperature of the refrigerant within the vapor compression system 72, a pressure of the refrigerant within the vapor compression system 72, and/or another suitable parameter. The controller 120 may then be configured to activate and/or increase a speed of the first pump 121 and/or the second pump 123 of the second working fluid circuit 116 to enable flow of the second working fluid between the ice bank 101 and the second heat exchanger 108. As such, cooled second working fluid may absorb thermal energy from the airflow 117 within the second heat exchanger 108.

As shown in the illustrated embodiment of FIG. 5, the second heat exchanger 108 is part of the air handling unit 102 and/or within a flow path of the airflow 117 that is ultimately directed to the air handling unit 102. In some embodiments, the second heat exchanger 108 is a fin and tube heat exchanger that is configured to exchange thermal energy between the airflow 117 and the second working fluid. In other embodiments, the second heat exchanger 108 may enable direct contact between the airflow 117 and the second working fluid to evaporatively cool the airflow 117. In still further embodiments, the second heat exchanger 108 may include another suitable heat exchanger configuration. As discussed in more detail below, the second heat exchanger 108 may generally pre-treat, or pre-cool, the airflow 117, before the airflow is directed toward an evaporator, such as the evaporator 80, of the HVAC unit 111.

Figure 6:
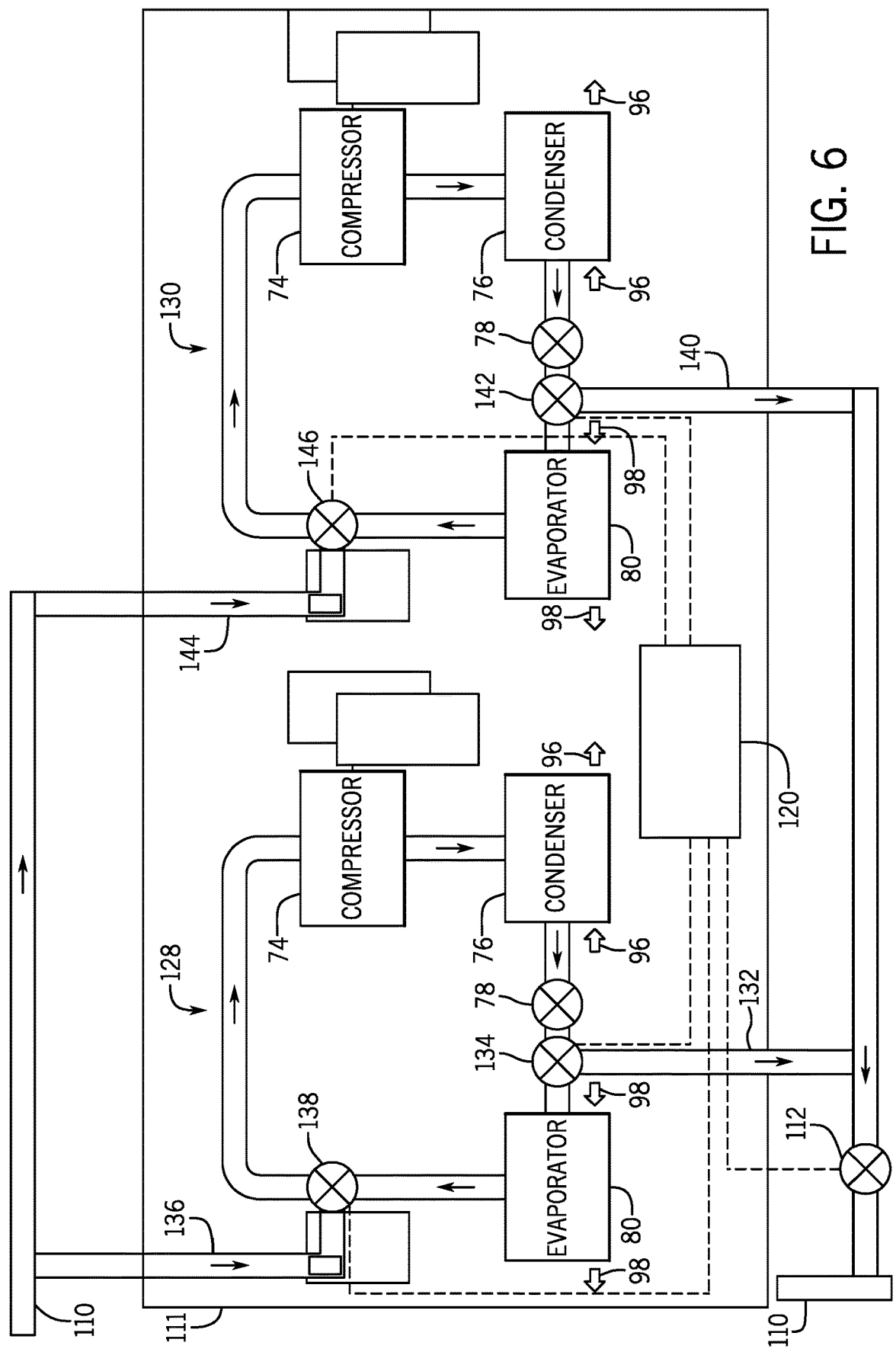
FIG. 6 is a schematic diagram of an embodiment of an HVAC unit, in accordance with an aspect of the present disclosure.

FIG. 6 is a schematic diagram of an embodiment of the HVAC unit 111, in accordance with an aspect of the present disclosure. The HVAC unit 111 may include one or more vapor compression circuits that may operate similar to the vapor compression system 72. As shown in the illustrated embodiment of FIG. 6, the HVAC unit 111 includes a first vapor compression circuit 128 and a second vapor compression circuit 130, which may condition the airflow 117, such as the supply air 98, in a series arrangement. In general, the first vapor compression circuit 128 and the second vapor compression circuit 130 are selectively fluidly coupled to the auxiliary refrigeration circuit 110 via the valve 112 and/or a respective valve positioned along each of the vapor compression circuits 128 and 130. As discussed above, with respect to FIG. 5, opening the valve 112 may regulate flow of a refrigerant along the auxiliary refrigeration circuit 110 to the first heat exchanger 104, where the refrigerant may exchange heat with the first working fluid.

The first vapor compression circuit 128 is selectively fluidly coupled to the bypass conduit 132 via a first bypass valve 134. The bypass conduit 132 is selectively fluidly coupled to the auxiliary refrigeration circuit 110 via the valve 112. As such, the first bypass valve 134 and the valve 112 may enable refrigerant flowing within the first vapor compression circuit 128 to flow into and through the auxiliary refrigerant circuit 110. As illustrated, the bypass conduit 132 is disposed downstream of the expansion valve 78 and upstream of the evaporator 80 of the first vapor compression circuit 128. As such, the refrigerant within the bypass conduit 132 and directed to the auxiliary refrigerant circuit 110 may be have a relatively low temperature upon reaching the first heat exchanger 104. Additionally, the first vapor compression circuit 128 may also include a return conduit 136 that is selectively fluidly coupled to the auxiliary refrigerant circuit 110 via a valve 138. In general, the first vapor compression circuit 128 may provide a flow of refrigerant to the auxiliary refrigerant circuit 110 via the first bypass valve 134. For instance, the first bypass valve 134 may be partially or completely opened to provide a flow of refrigerant from the first vapor compression circuit 128 to the auxiliary refrigerant circuit 110. The refrigerant from the first vapor compression circuit 128 is selectively provided back into the first vapor compression circuit 128 via the return conduit 136 and the valve 138. For instance, the valve 138 enabling refrigerant to return to the first vapor compression circuit 128 may open when the first bypass valve 134 directing refrigerant to the auxiliary refrigerant circuit 110 is opened, thereby enabling an amount of refrigerant within the first vapor compression circuit 128 to be substantially maintained.

The second vapor compression circuit 130 is selectively fluidly coupled to a second bypass conduit 140 via a second bypass valve 142. The second bypass conduit 140 is selectively fluidly coupled to the auxiliary refrigeration circuit 110 via the valve 112. As such, the second bypass valve 142 and the valve 112 may enable refrigerant flowing within the second vapor compression circuit 130 to flow into and through the auxiliary refrigeration circuit 110. Additionally, the second vapor compression circuit 130 is also fluidly coupled to a return conduit 144 via a valve 146. In general, the second vapor compression circuit 130 may provide a flow of refrigerant to the auxiliary refrigerant circuit 110 by partially or completely opening the valve 142. In some embodiments, the valve 112, which may be fluidly coupled to both the first bypass conduit 132 and the second bypass conduit 140, may be utilized to adjust a total flow of refrigerant from the first vapor compression circuit 128 and/or the second vapor compression circuit 130. For example, the valve 112 may include a butterfly valve or a solenoid valve that adjusts a total flow rate of refrigerant into the auxiliary refrigerant circuit 110 from the first vapor compression circuit 128 and/or the second vapor compression circuit 130. In some embodiments, the valves 134 and/or 142 may be on/off valves that enable refrigerant from the first vapor compression circuit 128 and/or the second vapor compression circuit 130, respectively, to bypass the respective evaporator 80 of the first vapor compression circuit 128 and/or the second vapor compression circuit 130 and flow toward the auxiliary refrigerant circuit 110. In other embodiments, each of the valves 112, 134, and/or 142 may be adjusted to control a flow rate of the refrigerant from the first vapor compression circuit 128 and/or the second vapor compression circuit 130 that is directed into the auxiliary refrigerant circuit 110.

Figure 7:
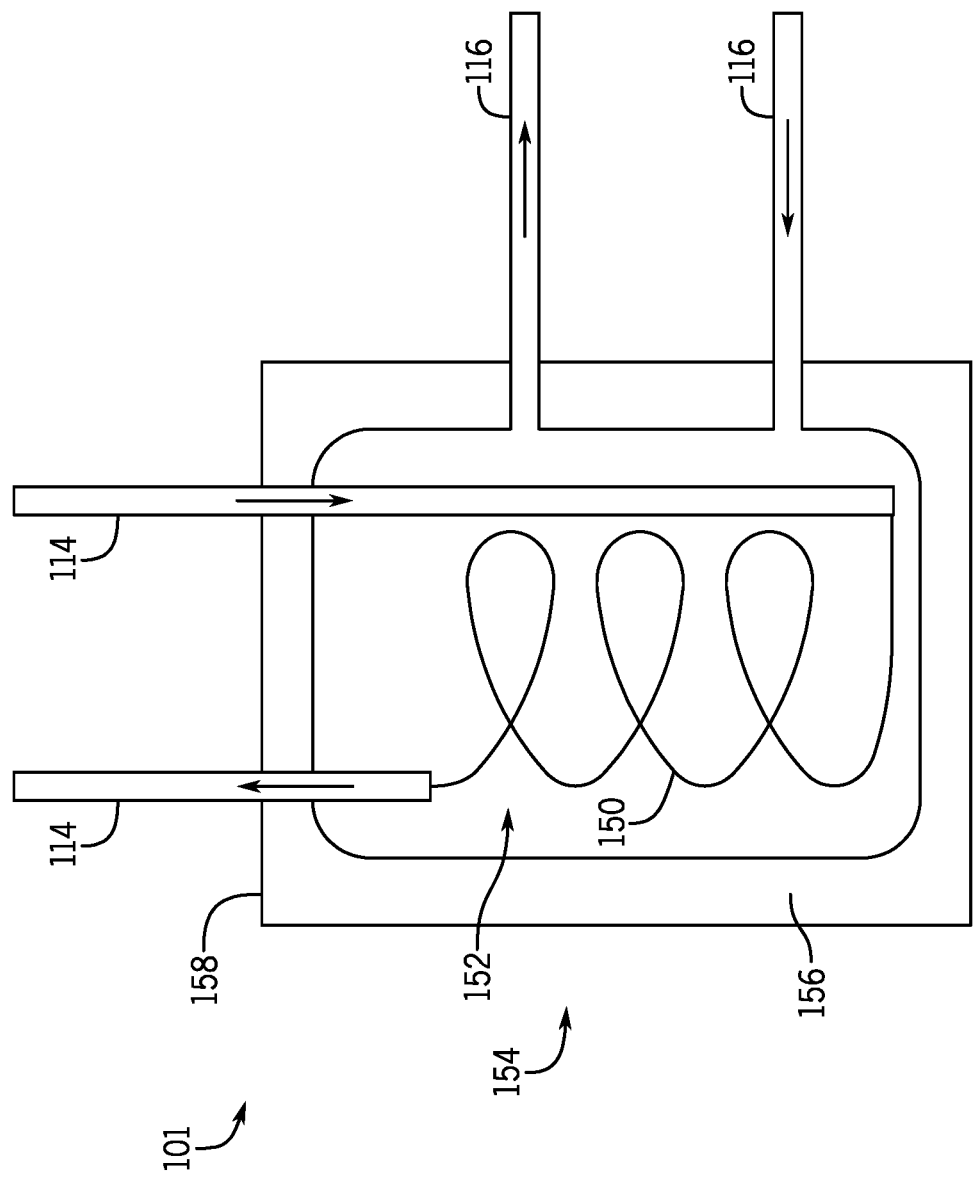
FIG. 7 is a schematic diagram of an embodiment of a cooling bank of an HVAC system, in accordance with an aspect of the present disclosure.

FIG. 7 is a schematic diagram of an embodiment of the ice bank 101, in accordance with an aspect of the present disclosure. As discussed herein, the first working fluid may be cooled via heat transfer with the refrigerant flow in the first heat exchanger 104. Further, the cooled first working fluid may cool or freeze at least a portion of the second working fluid in the ice bank 101 before the second working fluid is ultimately directed to the second heat exchanger 108. Further, the cooled or partially frozen second working fluid may provide supplemental cooling to the air handling unit 102, as discussed above with respect to FIG. 5.

Returning back to the illustrated embodiment of FIG. 7, the first working fluid of the first working fluid circuit 114 flows through a coil 150 that is at least partially disposed within an interior region 152 of a vessel 154 of the ice bank 101. Further, the interior region 152 may be fluidly coupled to the second working fluid circuit 116, which is configured to circulate the second working fluid between the interior region 152 of the vessel 154 and the second heat exchanger 108. As such, heat transfer between the first working fluid and the second working fluid may occur within the vessel 154 of the ice bank 101. In some embodiments, the vessel 154 includes a thermally insulating layer 156 separating an external surface 158 of the vessel 154 and the interior region 152 of the vessel 154. For example, the thermally insulating layer 156 may include a vacuum sealed layer that blocks heat transfer between the interior region 152 of the vessel 154 and the ambient environment surrounding the vessel 154. In other embodiments, the thermally insulating layer 156 may include an insulating material, such as a ceramic material or a polymeric material, which is configured to limit heat transfer across the thermally insulating layer 156. Additionally or alternatively, the vessel 154 may be disposed underground or covered to reduce exposure to sunlight and other elements of the surrounding environment to further reduce or prevent heat transfer between the interior region 152 of the vessel 154 and the surrounding environment.

Figure 8:
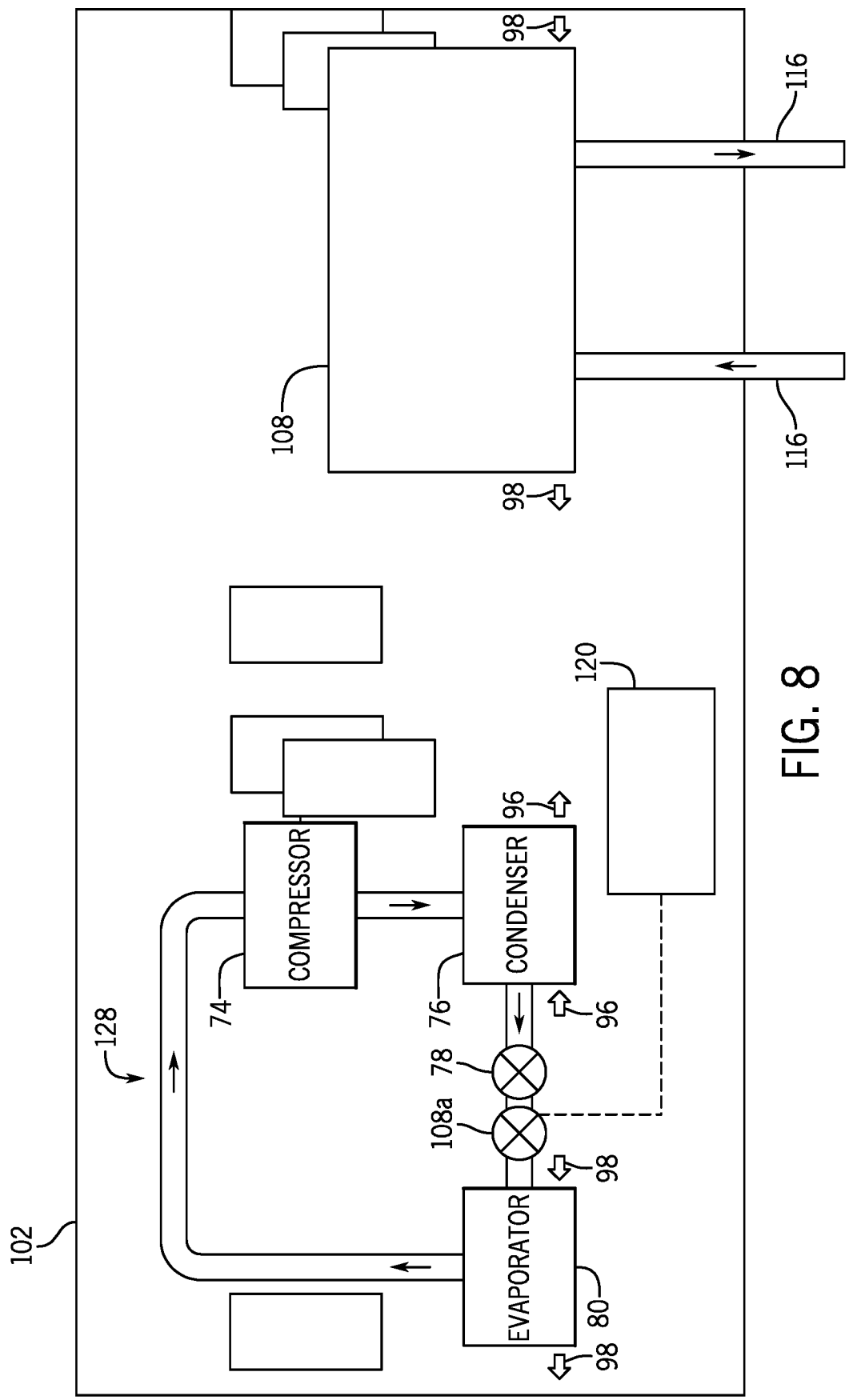
FIG. 8 is a schematic diagram of an embodiment of an air handling unit of am HVAC system, in accordance with an aspect of the present disclosure.

FIG. 8 is a schematic diagram of an embodiment of the air handling unit 102 having the second heat exchanger 108 upstream of the evaporator 80 of the first vapor compression circuit 128, in accordance with an aspect of the present disclosure. Additionally, the air handling unit 102 includes the second heat exchanger 108, which is fluidly coupled to the ice bank 101 via the second working fluid circuit 116. In some embodiments, the second heat exchanger 108 may positioned upstream of the evaporator 80 of the first vapor compression circuit 128 to pre-condition or pre-cool the airflow 117, such as an environmental air flow and/or return air flow, before reaching the evaporator 80 and exchanging thermal energy with the refrigerant within the evaporator 80. For example, the second working fluid flowing through the second heat exchanger 108 may absorb thermal energy from the airflow 117, thereby reducing a temperature of the airflow 117. The airflow 117 may also transfer thermal energy to refrigerant within the evaporator 80, thereby further reducing the temperature of the airflow 117 before the airflow 117 is directed to the conditioned space. It is presently recognized that a benefit of such an arrangement may be reduced energy costs of operating the HVAC system 100 during periods of high load demand.

Figure 9:
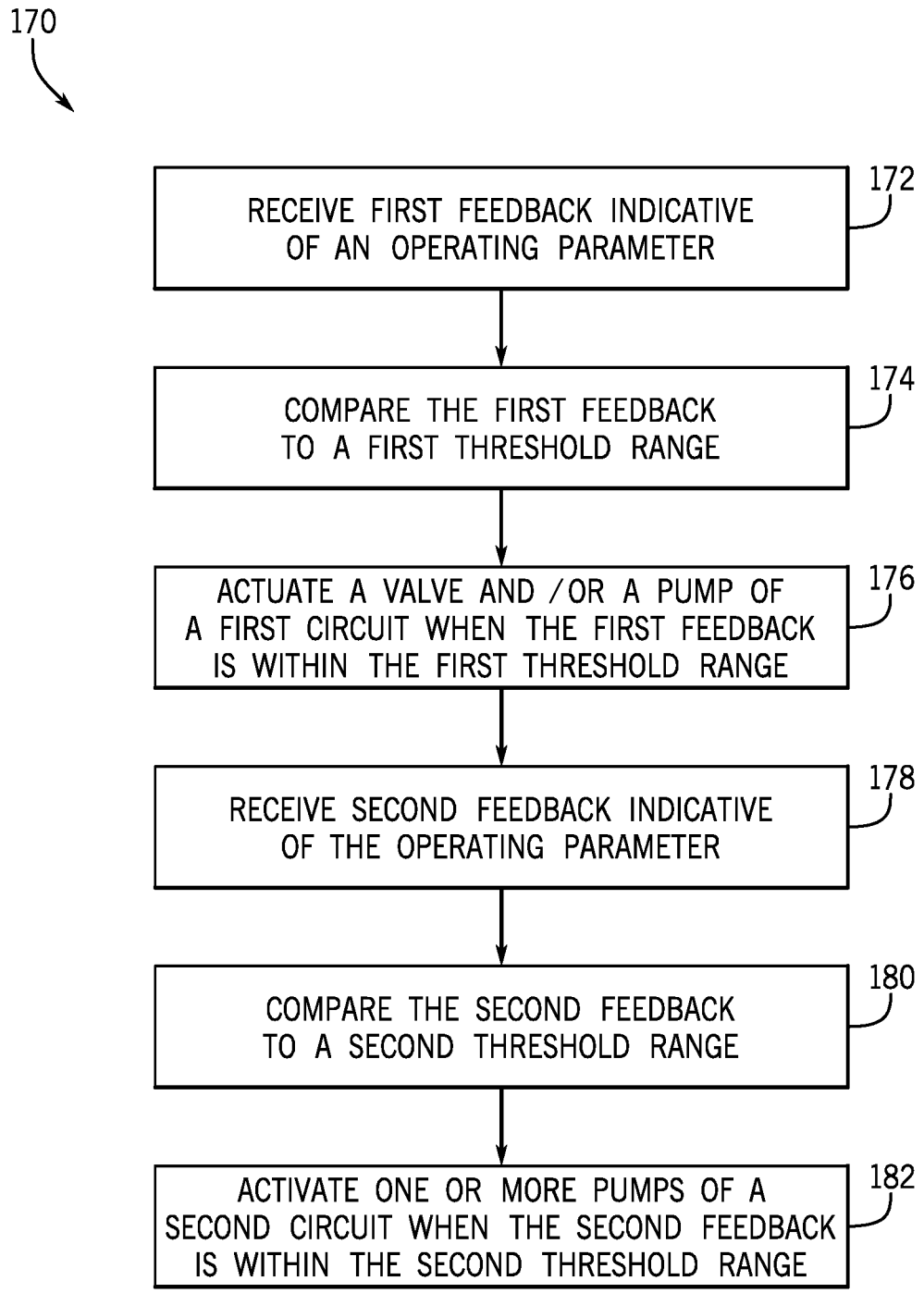
FIG. 9 is a flow diagram of an embodiment of a process for operating the HVAC system, in accordance with an aspect of the present disclosure.

FIG. 9 is a flow chart illustrating an embodiment of a process 170 for operating the auxiliary refrigerant circuit 110, the first working fluid circuit 114, and/or the second working fluid circuit 116 to increase the efficiency of the HVAC system 100. It is to be understood that the steps discussed herein are merely exemplary, and certain steps may be omitted or performed in a different order than the order described below. In some embodiments, the process 170 may be stored in the non-volatile memory 122 and executed by the processor 124 of the controller 120, or the steps of the process 170 may be stored in other suitable memory and executed by other suitable processing circuitry associated with the HVAC system 100.

As shown in the illustrated embodiment of FIG. 9, at block 172, first feedback indicative of an operating parameter of the HVAC system 100 is received. For example, the first feedback indicative of the operating parameter may be detected by a sensor or other feedback component of the HVAC system 100, and the first feedback may be communicated to a control system of the HVAC system 100. In some embodiments, the operating parameter may be the speed of the compressor 74, an amount of power supplied to the HVAC system 100, an amount of power supplied to the compressor 74, an ambient temperature, a temperature of an interior space to be conditioned by the HVAC system 100, a temperature of the refrigerant in the HVAC unit 111, a pressure of the refrigerant in the HVAC unit 111, or any combination thereof. In general, the operating parameter may be any parameter that is indicative of a performance, capacity, or load demand of the HVAC system 100. In some embodiments, using a combination of operating parameters may increase an accuracy of estimating the performance, capacity, or load demand of the HVAC system 100.

When the first feedback indicative of the operating parameter is received, the first feedback is compared to a first threshold range, as indicated in block 174. For example, the processor 124 may receive the first feedback and may compare the first feedback with the first threshold range. The first threshold range may be a range of values that is determined by an operator during manufacturing of the HVAC system 100. Additionally or alternatively, the first threshold range may be determined through experimental testing and may be stored within the non-volatile memory 122 of the controller 120. In other embodiments, the first feedback may be compared to a first threshold value instead of the first threshold range. That is, a determination may be made regarding whether the first feedback is greater than or less than the first threshold value rather than within or outside of a first threshold range. In any case, the first threshold range and/or the first threshold value may be indicative of a relatively low operating capacity or load demand of the HVAC system 100. For example, the first threshold range and/or the first threshold value may be indicative of the HVAC system 100 operating at less than 70% capacity, less than 60% capacity, less than 50% capacity, or less than 40% capacity. As such, the HVAC system 100 may divert at least a portion of refrigerant to the auxiliary refrigerant circuit 110 from the first vapor compression circuit 128 and/or the second vapor compression circuit 130 to enable thermal communication between the refrigerant and the first working fluid.

As a non-limiting example, the processor 124 may receive the first feedback indicative of the first operating parameter and may determine that the first feedback is less than the first threshold or within the first threshold range. Thereafter, the processor 124 may proceed to block 176 of the process 170. Should the processor 124 determine that the feedback is above the first threshold, or outside of the first threshold range, the processor 124 may take no action, and the HVAC system 100 may resume its current operation.

At block 176, a control signal may be provided to the valve 112, the first bypass valve 134, and/or the second bypass valve 142 to actuate the valve 112, the first bypass valve 134, and/or the second bypass valve 142 toward an open position to fluidly couple the first and/or second vapor compression circuits 128, 130 to the auxiliary refrigerant circuit 110. In some embodiments, a control signal may also be provided to the pump 119 of the first working fluid circuit 114 to begin circulating the first working fluid between the first heat exchanger 104 and the ice bank 101. Accordingly, the first working fluid may transfer thermal energy to the refrigerant via the first heat exchanger 104. Additionally, the first working fluid may absorb thermal energy from the second working fluid via the ice bank 101, thereby reducing a temperature of the second working fluid within the interior region 152 of the vessel 154 of the ice bank 101.

At block 178, second feedback indicative of the operating parameter of the HVAC system 100 is received. In some embodiments, the processor 124 may continuously receive feedback indicative of the operating parameter of the HVAC system 100. In other embodiments, the processor 124 may receive the feedback indicative of the operating parameter of the HVAC system 100 intermittently or at predetermined intervals, such as every second, every minute, every hour, and so forth. As referred to herein, the first feedback and the second feedback may include the feedback indicative of the operating parameter of the HVAC system 100 at different times or different periods of operation of the HVAC system 100. The second feedback is compared to a second threshold range, as indicated in block 180. As discussed above, with respect to the first threshold range, the second threshold range may be determined by an operator during manufacturing of the HVAC system 100. Additionally or alternatively, the second threshold range may be determined through experimental testing and stored within the non-volatile memory 122 of the controller 120. In other embodiments, the processor 124 may compare the second feedback to a second threshold value instead of the second threshold range. That is, the processor 124 may determine whether the second feedback is greater than or less than the second threshold value rather than within the second threshold range.

Continuing with the non-limiting example above, the processor 124 may determine that the second feedback is greater than the second threshold, or within the second threshold range, which may indicate that the HVAC system is operating above a certain capacity threshold. For example, the second threshold range and/or the second threshold value may be indicative of the HVAC system 100 operating at greater than 70% capacity, greater than 80% capacity, greater than 90% capacity, or greater than 95% capacity. As such, the HVAC system 100 may be configured to utilize supplemental cooling from the ice bank 101 in order to reduce an amount of power input to the HVAC system 100, such as to the HVAC unit 111.

Thereafter, the process 170 may proceed to block 182. In some embodiments, a determination that the second feedback is below the second threshold or outside of the second threshold range may be made. As such, the HVAC system 100 may compare the second feedback to the first threshold range and/or the first threshold value. If it is determined that the second feedback is below the first threshold value and/or within the first threshold range, the process 170 may proceed to block 176 to enable refrigerant to circulate through the auxiliary refrigerant circuit 110. In some embodiments, if it is determined that the second feedback is not below the first threshold, within the first threshold range, above the second threshold, or within the second threshold range, a control signal may be applied to operate the HVAC system 100 without diverting refrigerant to the auxiliary refrigerant circuit 110 and/or utilizing supplemental cooling via the second working fluid from the ice bank 101.

At block 182, a control signal is provided to the pump 121 and/or the pump 123 of the second working fluid circuit 116. The control signal may actuate the pumps 121, 123 to circulate the second working fluid between the ice bank 101 and the second heat exchanger 108 when the second feedback is greater than the second threshold, or within the second threshold range. Additionally, or alternatively, a control signal may be provided to the pump 119 of the first working fluid circuit 114 to stop circulating the first working fluid through the first working fluid circuit 114 and/or to reduce a flow rate of the first working fluid through the first working fluid circuit 114. As such, the second working fluid may provide supplemental cooling to the airflow 117 via the second heat exchanger 108, and the first working fluid may stop flowing through the ice bank 101.

Embodiments of the present disclosure are directed to an HVAC system that operates at an improved efficiency during periods where the HVAC system may operate at relatively high load demands or high operating capacity. For example, the HVAC system may include an air handling unit, a first heat exchanger, an ice bank, and a second heat exchanger. The air handling unit may transfer heat between a refrigerant and an airflow to reduce a temperature of the airflow before it is directed toward an interior space to be conditioned by the HVAC system. The first heat exchanger is configured to transfer heat between the refrigerant and a first working fluid in order to generate and store cooling fluid that may be utilized during periods of high load demand and/or high operating capacity. For example, an ice bank may store a second working fluid that transfers heat to the first working fluid. During periods of high load demand and/or high operating capacity, the second working fluid within the ice bank may be directed to the second heat exchanger, which may absorb heat from the airflow upstream of a third heat exchanger of the air handling unit that is configured to condition the airflow within the air handling unit. As such, the second heat exchanger pre-cools the airflow prior to thermal communication with the third heat exchanger of the air handling unit. In operation, the ice bank stores cooled second working fluid that, when directed to the second heat exchanger, supplements cooling of the airflow.

While only certain features and embodiments of the present disclosure have been illustrated and described, many modifications and changes may occur to those skilled in the art, such as variations in sizes, dimensions, structures, shapes and proportions of the various elements, values of parameters, including temperatures, pressures, and so forth, mounting arrangements, use of materials, colors, orientations, and the like, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
    an air handler configured to transfer heat between a refrigerant and an airflow;
    a first heat exchanger configured to receive the refrigerant from the air handler and transfer heat between the refrigerant and a first working fluid;
    a cooling bank including a vessel and a coil disposed in the vessel, wherein the coil is configured receive the first working fluid from the first heat exchanger and configured to transfer heat between the first working fluid and a second working fluid within the vessel;
    a second heat exchanger configured to receive the second working fluid and to transfer heat between the second working fluid and the airflow, wherein the second heat exchanger is disposed upstream of the air handler with respect to a flow path of the airflow;
    a first pump configured to circulate the first working fluid between the first heat exchanger and the cooling bank;
    a second pump configured to circulate the second working fluid between the cooling bank and the second heat exchanger; and
    a controller communicatively coupled to the first pump and the second pump, wherein the controller is configured to:
        activate the first pump when an operating parameter falls below a first threshold; and
        activate the second pump when the operating parameter exceeds a second threshold, greater than a first threshold.

2. The HVAC system of claim 1, wherein the operating parameter is an ambient temperature, an amount of power supplied to the HVAC system, an amount of power supplied to a compressor of the HVAC system, a speed of the compressor, a temperature of the refrigerant, a pressure of the refrigerant, a temperature of an interior space to be conditioned by the HVAC system, or any combination thereof.

3. The HVAC system of claim 1, wherein the first heat exchanger is a shell and tube heat exchanger and the second heat exchanger is a fin and tube heat exchanger.

4. The HVAC system of claim 1, wherein the first working fluid is brine, and the second working fluid is water.

5. The HVAC system of claim 1, wherein the air handler includes a vapor compression circuit configured to circulate the refrigerant between an evaporator and a condenser of the vapor compression circuit.

6. The HVAC system of claim 5, wherein the evaporator is disposed within the flow path of the airflow downstream of the second heat exchanger.

7. The HVAC system of claim 1, wherein the cooling bank includes an interior region and a thermally insulating layer, wherein the thermally insulating layer is configured to prevent heat transfer between the interior region and an ambient environment surrounding the cooling bank.

8. The HVAC system of claim 7, wherein the thermally insulating layer is a vacuum sealed space.

* * * * *